INVENTOR.
PETER D. LACY

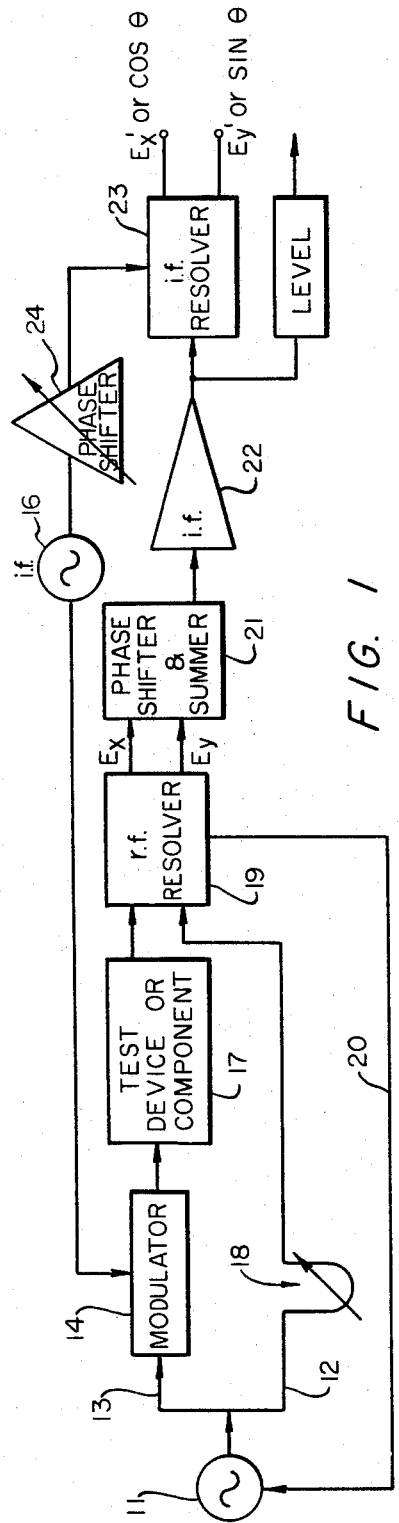
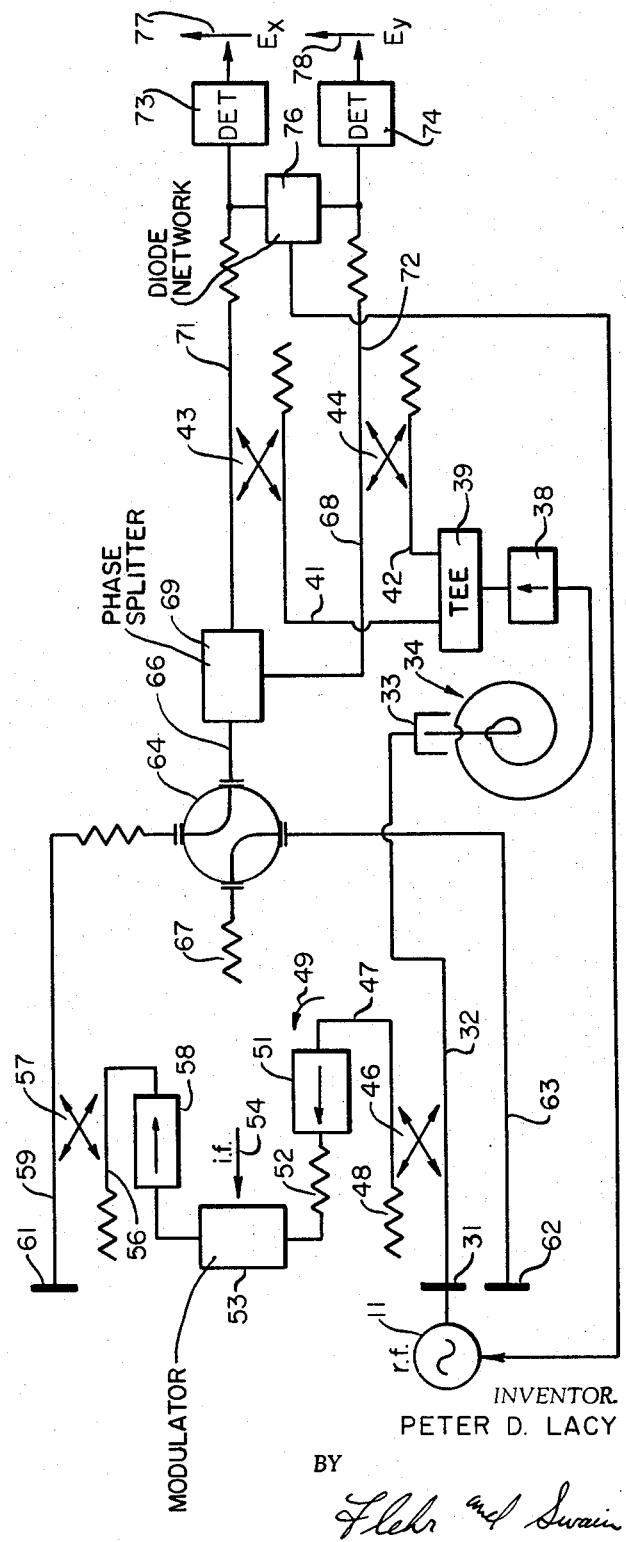

INVENTOR.
PETER D. LACY
BY
ATTORNEYS

United States Patent Office 3,416,077
Patented Dec. 10, 1968

3,416,077
MULTIFUNCTION HIGH FREQUENCY TESTING APPARATUS IN WHICH R.F. SIGNALS ARE CONVERTED TO INTERMEDIATE FREQUENCIES AND PROCESSED BY COMMON ELECTRONIC CIRCUITS
Peter D. Lacy, Palo Alto, Calif., assignor to Wiltron Company, Palo Alto, Calif., a corporation of California
Filed Sept. 22, 1965, Ser. No. 489,113
19 Claims. (Cl. 324—58)

ABSTRACT OF THE DISCLOSURE

A multifunction testing apparatus for testing either the impedance, phase, or amplitude characteristics of microwave components. An R.F. signal source is swept and in one signal path is modulated by an I.F. signal, coupled into a test component, and then to an R.F. resolver. A second input to the R.F. resolver is the R.F. signal which has been delayed a predetermined time. The resolver serves as a phase coherent mixer that provides information in the form of orthogonal components as to the amplitude and phase of the complex R.F. test signal as compared to the reference path signal. The resolver produces a pair of I.F. signals whose amplitude is proportional to the $E \cos \theta$ and $E \sin \theta$ components of the test signal. The two I.F. signals are shifted in phase from each other by 90°, recombined to form a complex I.F. signal, and selectively processed in one of a pair of amplifier channels which may be linear or of a constant level due to A.G.C. The A.G.C. channel produces logarithmic amplitude and phase information. Alternatively, the linear amplifier channel provides linear amplitude information and feeds synchronous sine and cosine detectors to produce a pair of outputs suitable for plotting on a Smith impedance chart.

This invention relates generally to high frequency testing apparatus and more particularly to such an apparatus capable of performing a variety of measurements such as transmission, phase and amplitude, and complex reflection coefficient of electronic components and devices, automatically and accurately.

The complete characterization of electronic components and devices, such as isolators, couplers, phase shifters, travelling wave tubes, klystrons, transistors, radar and communication systems, especially on a sweep frequency basis, has in the past been achieved by employing separate or individual instruments to measure each of the parameters: phase, amplitude, and reflection coefficient or impedance.

It is a general object of the present invention to provide a high frequency testing apparatus for selectively performing a number of electronic measurements.

It is another object of the present invention to provide a versatile high frequency testing apparatus capable of providing highly accurate measurements of the phase, amplitude and/or impedance of components and devices.

It is still another object of the present invention to provide a multi-function high frequency testing apparatus including means providing a reference signal whereby only deviations in phase and amplitude from the reference are measured.

It is another object of the present invention to provide a multi-function test set in which a variable reference delay simplifies the obtaining of transfer phase data by minimizing the phase slope.

It is another object of the present invention to provide a multi-function test set in which the microwave or R.F. signals are converted to intermediate frequencies and then processed by common electronic circuits.

It is a further object of the present invention to provide a testing apparatus which provides a linear and logarithmic indication of amplitude over a wide dynamic range.

It is still a further object of the present invention to provide a multi-function test apparatus including means for indicating the sector in which phase angles are measured.

It is a further object of the present invention to provide a multi-function high frequency testing apparatus capable of providing information on a sweep frequency basis.

It is a further object of the present invention to provide a convenient means of making transmission and reflection measurements in the same test set-up with simple electric switching.

The foregoing and other objects of the invention will become more clearly apparent from the following description when taken in conjunction with the accompanying drawing.

Figure 3:
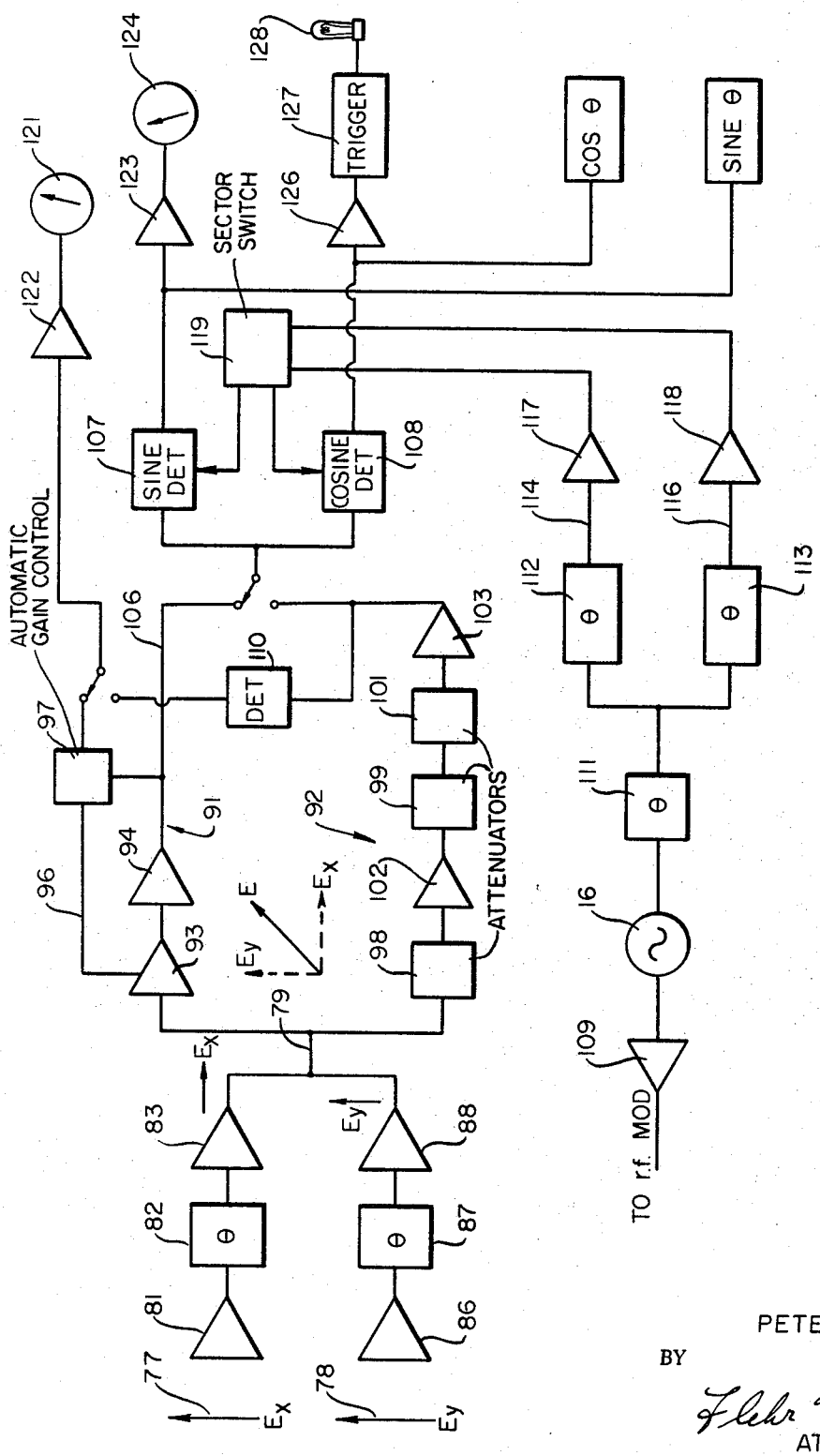
Figure 4:
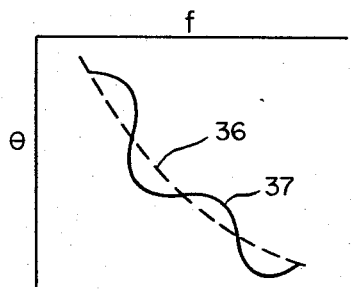
Figure 5:
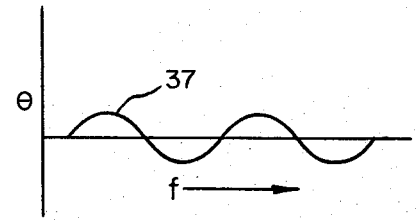
Figure 6:
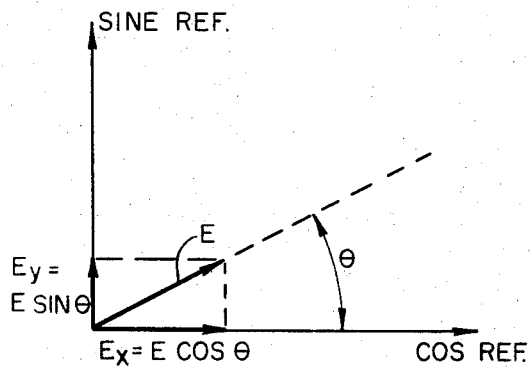
Figure 7:
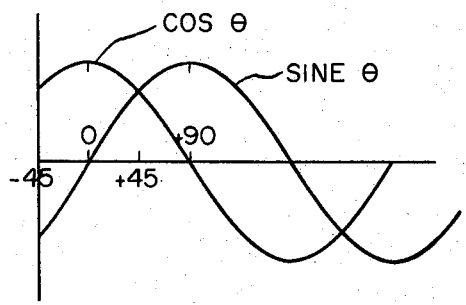
Figure 8:
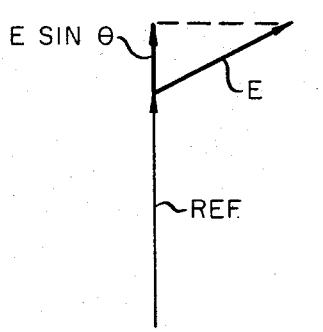
Figure 9:
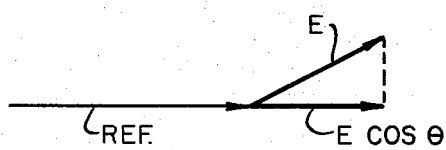

Referring to the drawing:
FIGURE 1 is a schematic block diagram of high frequency testing apparatus according to the invention;
FIGURE 2 is a schematic diagram, in more detail, of the R.F. resolver portion of the testing apparatus;
FIGURE 3 is a schematic diagram, in more detail, of the I.F. processor portion of the testing apparatus;
FIGURE 4 schematically shows the phase curve that might be encountered in devices or components under test when testing over a wide band of frequencies;
FIGURE 5 shows the phase output for the device of FIGURE 4 when there is provided a reference delay;
FIGURE 6 is a vector diagram of the R.F. signals in the resolver shown in FIGURE 2;
FIGURE 7 shows the waveform including phase of the I.F. signals applied to the synchronous detectors;
FIGURE 8 is a vector diagram showing the signals in the sin $\theta$ detector; and
FIGURE 9 is a vector diagram showing the signals in the sin $\theta$ detector.

Generally, the signal in the R.F. portion of the apparatus includes a modulated test signal and continuous wave reference signal. These signals are fed into a two-phase mixer that provides the orthogonal components of the amplitude and phase of the complex R.F. test signals as compared to the reference signal. These orthogonal components emerge from the mixtures as a pair of I.F. signals whose amplitude is proportional to the amplitude, $E$, of the unknown signal times the sine and cosine of $\theta$ where $\theta$ is the angle between the test signal and a reference signal, respectively.

The I.F. signals, which correspond to the orthogonal components of the R.F. signal, are applied to a processor which combines and amplifies the signals. The combined amplified signal is detected to provide output signals corresponding to the phase, amplitude and/or complex reflection coefficient of the device or component under test.

Referring to FIGURE 1, the R.F. signal from an R.F. generator 11 is divided and applied to a reference and a test path 12 and 13, respectively. In the test path the signal is modulated at modulator 14 by any of several conventional methods including amplitude, phase, suppressed carriers and single sideband modulation. An I.F. modulating signal is applied to the modulator from I.F. generator 16. The modulated R.F. signal is applied to the R.F. component or device 17 under test. The reference path includes means 18 for providing requisite phase delay or introduction of a comparison device. The modulated signal from the test component and the strong R.F. CW signal are applied to an R.F. resolver 19 which comprises a phase coherent mixer. The CW signal plays the role of the local oscillator in a phase coherent heterodyne mixer. The advantage of using a single frequency (R.F. generator) is that in swept frequency operation, there is no need for a tracked local oscillator. The offset test frequency components are provided by modulation action. A conventional heterodyne test arrangement would require two R.F. generators with a constant R.F. offset. The mixer provides linear conversion of the modulated test signal. The output from the mixer will be either a single signal or an orthogonal two-phase signal depending on the test signal modulating method. A single sideband modulator will provide a signal that, when combined with the CW reference signal in a single mixer, provides an I.F. resultant that provides full amplitude and phase correspondence with the R.F. test signal. With amplitude, phase or suppressed carrier modulation, a two-phase mixer is required. The resolver shown provides signals $E_x$ and $E_y$ representing the orthogonal components of the test signal.

A control signal is derived at the resolver to control the R.F. generator whereby the signal at the output of the mixer 19 is levelled. This signal is applied to the levelling circuits of the R.F. generator through the line 20.

Obtaining a constant sweeper input power level over a frequency sweep permits constant calibration of the amplitude factor for both impedance and transmission measurements. By using a levelling control voltage from the resolver mixers, levelling at the point of measurement is achieved so as to eliminate level variations at the output of the sweeper and also level variations that occur in the CW arm of the R.F. resolver. Since the D-C signal output of the mixers is proportional to the CW component, it levels the CW signal but it is not affected by level in the modulation channel which is so much smaller it amounts to only .01 percent and is negligible.

The two signals, $E_x$ and $E_y$, are applied to individual networks which shift their phase so that they have an orthogonal relationship and combine the shifted signals into a single complex signal. The phase shifter and combiner is shown at 21. The complex signal is amplified by a single amplifier 22 of the linear or automatic gain control (A.G.C.) type to assure that the two components of the complex signal are identically treated. This eliminates the necessity of constructing an identical pair of amplifiers so that they do not introduce any differential phase shift, gain, etc.

The complex amplified signal from the I.F. amplifier is applied to an I.F. resolver 23 which includes a pair of synchronous detectors. Reference signals are applied to the synchronous detectors from the I.F. generator 16 through a phase shifter 24. The phase shifter provides further means for introducing a phase delay to compensate or correct for phase delays in the test component or device. The output from the I.F. resolver is a pair of D.C. signals corresponding to $E \sin \theta$ and $E \cos \theta$ when the I.F. amplifier is linear, and $\cos \theta$ and $\sin \theta$ when the amplifier is an A.G.C. type with a constant output.

Outputs from the I.F. amplifiers are also employed to give amplitude measurement. The output corresponds to either true amplitude when a linear amplifier is employed or the logarithm of the amplitude when the amplifier is an A.G.C. type.

Referring now to FIGURE 2, there is shown a schematic diagram of the electronic components forming the R.F. portion of the circuit of FIGURE 1. The input continuous wave (CW) R.F. signal is applied to the input terminal 31, schematically shown as a waveguide flange. The lines appearing in the drawing are schematic and are intended to illustrate microwave transmission lines of the waveguide or coaxial type.

The CW R.F. signal travels along the transmission line 32 through a line stretcher 33 and reference length of transmission line 34 providing a desired delay or phase shift. In measuring the phase characteristics of a device which may be as schematically illlustrated in FIGURE 4, it is desirable to take out the smoothed average 36 so that the small deviations 37 can be observed. This is accomplished by introducing a reference having similar linear delay characteristics whereby only the differences are observed, as illustrated in FIGURE 5. The CW R.F. signal is then applied through an isolator 38 to a waveguide T junction 39. The CW R.F. signal appears on the lines 41 and 42 as a strong CW reference signal having the same phase and amplitude for application to the mixers or couplers 43 and 44.

Directional coupler 46 directs a portion of the R.F. energy travelling in the line 32 to the line 47. The coupler is terminated at 48 to prevent any reflections. The coupled signal travels, as shown by the arrow 49, through isolator 51 and attenuator 52 into a modulator 53. The R.F. signal is modulated by an I.F. signal schematically illustrated at 54. The modulated test signal is applied to arm 56 of the directional coupler 57 through an isolator 58. The test signal is then available on transmission line 59. The I.F. signal employed is preferably relatively high. For example, it has been found that a frequency of 139 kc. gives excellent results. The use of isolators 51 and 58 to isolate the modulator from the R.F. reference lines and from the test line has also provided improved performance. The above combination gives improved sensitivity and permits operation at low signal levels.

A device or component to be tested is connected between the test terminals 61 and 62 connected to transmission lines 59 and 63, respectively.

For measurement of reflection coefficient, electronic switch 64 is connected so that the line 59 is coupled to the line 66 whereby energy reflected from the component is available on line 66. Any energy which passes through the component under test travels into test terminal 62 along transmission line 63 and through switch 64 to termination 67. To measure transfer characteristics, the switch 64 is connected so that the transmission line 63 is connected to the transmission line 66, while the transmission line 59 is connected to the termination 67.

Half of the reflected or transmitted modulated R.F. energy travelling on the line 66 is coupled into line 68 by a phase splitter 69. The phase splitter introduces a 90° phase shift in the signal. The couplers 43 and 44 serve as combiners, combining the modulated R.F. test signal with the CW R.F. reference signal. The combined signals appearing on the lines 71 and 72 are detected by amplitude detectors 73 and 74 to provide output I.F. signals whose amplitude is proportional to the orthogonal components of the R.F. signal, that is, to $E \sin \theta$ and $E \cos \theta$, where E is the amplitude of the R.F. test signal and $\theta$ the angle with respect to the reference signal. This is shown in the vector diagram of FIGURE 6. By using the strong CW reference signal, linear detection occurs in the square law region of the diode current voltage curve. This affords a wide dynamic range of operation, almost twice the range in db that would be available with a single signal into a square law detector. Further, the use of a two signal mixing technique enables the use of simplified apparatus as discussed above. The signals on the lines 71 and 72 are applied to a diode network 76 which provides an output D.C. signal for levelling, previously described with reference to FIGURE 1.

The processor for processing the two I.F. signals is shown in FIGURE 3. The signals 77 and 78 are reconstituted into a single complex I.F. signal which appears at the transmission line 79. The I.F. signal representation of $E \cos \theta$ is amplified by an I.F. amplifier 81 the phase shifted +45° by phase shifter 82 and further amplified by I.F. amplifier 83. The other signal representation of $E \sin \theta$ likewise is amplified by an I.F. amplifier 86 the phase shifted by −45° by phase shifter 87 and further amplified by I.F. amplifier 88. The combined signal on line 79 is directed into a pair of I.F. amplifying channels. As previously described, the signal channels each operate on both components to minimize differential phase shift, gain, etc.

One of the channels, 91 includes A.G.C. to provide a constant level output signal. The other channel, 92, includes a linear amplifier and precision attenuators to provide high resolution, high accuracy level measurements.

The A.G.C. channel 91 includes a log amplifier 93, followed by a linear amplifier 94. Feedback is provided along line 96 by the A.G.C. circuit 97. The linear channel includes precision attenuators 98, 99 and 101, these attenuators being, for example, 0–30 db, 0–20 db, 0–10 db, respectively. The channel 92 also includes linear I.F. amplifiers 102 and 103.

The log channel 91 is used for phase measurements since the amplitude factor is eliminated by the normalizing or A.G.C. action. This leaves the two quantities $\sin \theta$ and $\cos \theta$ appearing on the line 106. Synchronous detectors 107 and 108, which are synchronized by reference signals from the I.F. generator 16, serve to detect the signals and provide D.C. signals representative of $\sin \theta$ and $\cos \theta$ to give the phase measurement.

One output of the generator 16 is amplified by I.F. amplifier 109 and provides the modulation signal for the modulator 14 in the R.F. resolver. Another output is applied to a phase shifter 111 whose output is applied to phase shifters 112 and 113 which shift the phase plus and minus 45°. The output of the phase shifters appears on the lines 114 and 116, is amplified by amplifiers 117 and 118, and applied to a sector switch 119 which controls the application of the signals to the synchronous detectors 107 and 108. The phase shifter provides means for introducing a given phase delay whereby to shift the reference from which a delay is measured.

For impedance measurements, the two terms $E \sin \theta$ and $E \cos \theta$ are the coordinates required for a Smith chart presentation. To achieve equal amplification, they are amplified in the common amplifier, the linear I.F. amplifiers 102 and 103. The synchronous detectors 107 and 108 separate the two signals at the output of the amplifier 103 and provide D.C. signals proportional thereto. These signals can then be applied to the horizontal and vertical amplifiers of an oscilloscope to give the desired presentation.

For amplitude measurements, there are two types of measurements provided depending upon the amplifier used. The log I.F. amplifier is A.G.C. controlled over a wide dynamic range. The A.G.C. is linearized so as to have a linear relationship between the D.C. control voltage and the logarithm of the input signal. The D.C. control signal provides the read-out for amplitude measurements on the 60 db and 20 db level meter ranges. The D.C. signal is applied to meter 121 through amplifier 122.

When the amplitude read-out is derived from the linear I.F. amplifier, the principle of operation is to utilize a vector sum of the quadrature components $E \sin \theta$ and $E \cos \theta$. The magnitude of this vector sum is the amplitude E. A detector 110 detects the signal in the linear range of the crystal. This D.C. signal is applied to meter 121 through amplifier 122. To achieve logarithmic read-out, the meter can be calibrated with a log scale. The precision attenuators 98, 99 and 101 give an accurate attenuation reference against which the R.F. attenuator in the unknown device can be compared. The attenuators make it possible to have a high resolution at any power input by permitting use of a sensitive output meter and attenuating the signals as their amplitude increases.

When reading phase angles, there can be an ambiguity as to which quadrant is being considered. For this purpose, the sector switch 119 is employed and the output of the detectors applied as shown in FIGURE 3. The output of synchronous detector 107 is amplified by amplifier 123 and applied to meter 124. The meter is preferably a center scale meter having the center of the scale expanded and the outside of the scale compressed. The output of synchronous detector 108 is amplified by amplifier 126 and applied to trigger circuit 127. The output of the trigger circuit drives a display device such as an indicating lamp.

Referring to FIGURE 7, there is shown the sine and cosine components of a signal. It would be desirable to obtain the phase reading along the sine wave between the ±45° points since the variations per degree of phase shift are larger and relatively linear. If the reference to the sine detector is +90° with respect to the component of the I.F. signal, the vector diagram is substantially as shown in FIGURE 8. If the I.F. signal changes with respect to this angle, the output from the synchronous detectors will be either plus or minus depending on the phase. The dotted vectors show a phase advance. The vector relationships in the cosine detector are shown in FIGURE 9. The reference signal has a 0° with respect to the cosine component. It is seen that the output will be positive for the same variations. The positive output from the cosine detector triggers the circuit 127 and energizes indicator 128. The phase of the signals is then the meter reading.

To measure phase in other quadrants, the reference inputs to the sine detector and cosine detectors from sector switch 119 are as follows: to measure 90±45; sine detector reference 180°, cosine detector reference +90; to measure 180°±45°; sine detector reference 270°, cosine detector reference 180°; and to measure 270°±45°; sine detector reference +360°; cosine detector reference 270°.

Thus, it is seen that there has been provided a high frequency testing apparatus permitting a variety of measurements and which meets the objectives set out above.

I claim:

1. A high frequency testing apparatus comprising means for receiving a signal from an R.F. signal generator, means for directing said signal into a test path and a reference path, an I.F. signal generator, a modulator in said test path serving to receive a signal from said I.F. generator and modulate said R.F. signal in accordance therewith to provide a modulated test signal, means for connecting a device to be tested in said test path, an R.F. resolver connected to receive the modulated test signal from said device and the R.F. signal on said reference path and providing a pair of I.F. output signals representing the orthogonal components of the modulated R.F. test signal, means for operating on said I.F. signals to form a complex I.F. signal, means for amplifying said complex I.F. signal, and an I.F. resolver providing output signals corresponding to the orthogonal components of the complex I.F. signal.

2. A high frequency testing apparatus as in claim 1 including means providing a levelling signal proportional to the amplitude of the R.F. signal at the R.F. resolver said means being coupled to said R.F. generator for regulating the amplitude of the generated R.F. signal.

3. A high frequency testing apparatus as in claim 1 in which said test path includes a series connected switch for slectively coupling through said test path the modulated R.F. energy reflected by said device or the energy transmitted by said device.

4. A high frequency testing apparatus as in claim 1 wherein said I.F. amplifying means includes an amplifier coupled to said means for operating on said I.F. signals with an automatic gain control circuit providing a logarithmic feedback signal thereto.

5. A high frequency testing apparatus as in claim 1 wherein said I.F. amplifier includes at least one linear amplifier and at least one precision attenuator.

6. A high frequency testing apparatus as in claim 1 wherein said I.F. resolver comprises sine and cosine detectors for receiving signals from said means for amplifying said I.F. signal and reference signals from said I.F. signal generator and for providing output signals corresponding to the sine and cosine of the angle between the I.F. signal and the reference signals.

7. A high frequency testing apparatus as in claim 6 including means for applying said reference signals to said sine and cosine detectors comprising means for applying signals having an orthogonal relationship and selected phase, and means coupled to said cosine detector for providing an indication of the sector of such signals having an orthogonal relationship.

8. A high frequency testing apparatus as in claim 1 wherein said I.F. resolver includes sine and cosine detectors for receiving signals from said means for amplifying said I.F. signal, means for applying a reference signal from said I.F. signal generator to said sine and cosine detectors, and means for indicating the phase sector of said reference signal.

9. A high frequency testing apparatus as in claim 8 including means coupled to said I.F. signal generator for varying the phase of the reference signal applied to said sine and cosine detectors.

10. A high frequency testing apparatus as in claim 1 wherein said reference path includes a series connected variable reference delay.

11. A high frequency testing apparatus as in claim 1 wherein said I.F. generator generates a signal having frequency greater than 100 kc.

12. A high frequency testing apparatus as in claim 1 wherein said I.F. amplifier includes first and second channels, said first channel including an automatic gain control amplifier and a log feedback circuit and said second channel including a linear amplifier and precision attenuators, and means for selectively connecting one of said channels to said I.F. resolver.

13. A high frequency testing apparatus as in claim 12 including an amplitude detector for detecting the output of said linear amplifier and precision attenuators, and means for indicating the amplitude of the detected signal.

14. A high frequency testing apparatus as in claim 12 including means connected to said automatic gain control amplifier for indicating the amplitude of the signal thereon.

15. A high frequency testing apparatus as in claim 1 wherein said reference path includes means for series coupling into said path a reference device.

16. A high frequency testing apparatus including an R.F. reference transmission line, an R.F. signal generator coupled to said line, means for introducing a reference delay in said transmission line, first and second mixers, first and second transmission lines connected to said mixers, a junction connecting said reference transmission line to said first and second lines to divide and apply R.F. signals to the same, an R.F. test signal transmission line connected to apply signals to said first mixer, means for coupling energy from said test signal transmission line to said second mixer and introducing a 90° phase shift to such test signal, means for coupling energy from said reference line, a modulator connected to receive said coupled energy and modulate the same, third and fourth transmission lines having one end forming test terminals for coupling to devices to be tested, means for coupling energy from said modulator to one of said third and fourth transmission lines, switch means for selectively connecting one of said last named lines to said test signal transmission line, detectors connected to said mixers and providing I.F. output signals proportional to the phase and amplitude of the test signal, and means for processing said I.F. output signals and providing electrical output signals proportional to a parameter of the device connected to the test terminals.

17. A high frequency testing apparatus as in claim 16 wherein said means for processing includes means for combining said I.F. signals to form a complex I.F. signal, means for amplifying said I.F. complex signal, and an I.F. resolver providing said electrical output.

18. A high frequency testing apparatus as in claim 17 including means providing a levelling signal proportional to the amplitude of the R.F. signal at the R.F. resolver said means being coupled to said R.F. generator for regulating the amplitude of the generated R.F. signal.

19. A high frequency testing apparatus as in claim 17 wherein said I.F. amplifier includes first and second channels, said first channel including a log amplifier and an automatic gain control feedback circuit and said second channel including a linear amplifier and precision attenuators, and means for selectively connecting one of said channels to said I.F. resolver.

References Cited

UNITED STATES PATENTS

| | | | |
|---|---|---|---|
| 2,763,830 | 9/1956 | Pihl. | |
| 3,115,131 | 12/1963 | Holliday | 324—58.5 X |
| 3,227,949 | 1/1966 | Oberbeck | 324—84 X |
| 3,265,967 | 8/1966 | Heald | 324—58 X |
| 3,281,679 | 10/1966 | Schafer | 324—58 X |
| 3,317,827 | 5/1967 | Kuhn | 324—58.5 |

OTHER REFERENCES

Cohn et al., article in Microwave Journal, February 1964, pp. 49–56.

RUDOLPH V. ROLINEC, *Primary Examiner.*

P. F. WILLE, *Assistant Examiner.*

U.S. Cl. X.R.

324—84